(12) United States Patent
Kerxhalli et al.

(10) Patent No.: US 6,903,758 B1
(45) Date of Patent: Jun. 7, 2005

(54) METHOD FOR MAINTAINING IMAGE SQUARENESS AND IMAGE ON IMAGE REGISTRATION

(75) Inventors: David M. Kerxhalli, Rochester, NY (US); Keith A. May, Palmyra, NY (US); Brian R. Conrow, Rochester, NY (US)

(73) Assignee: Xerox Corporation, Stamford, CT (US)

(*) Notice: Subject to any disclaimer, the term of this patent is extended or adjusted under 35 U.S.C. 154(b) by 125 days.

(21) Appl. No.: 10/630,073

(22) Filed: Jul. 30, 2003

Related U.S. Application Data
(60) Provisional application No. 60/434,197, filed on Dec. 17, 2002.

(51) Int. Cl.[7] ............................................. G03G 15/00
(52) U.S. Cl. ...................................... 347/116; 399/301
(58) Field of Search ..................... 347/116–118, 173; 399/301; 400/124.08, 124.09, 120.02, 120.04

(56) References Cited

U.S. PATENT DOCUMENTS

| | | | |
|---|---|---|---|
| 4,611,901 A | 9/1986 | Kohyama et al. | ............... 355/4 |
| 4,660,059 A | 4/1987 | O'Brien | ....................... 346/157 |
| 4,833,503 A | 5/1989 | Snelling | ...................... 355/259 |
| 5,642,202 A | 6/1997 | Williams et al. | ............ 358/406 |
| 5,821,971 A | 10/1998 | Rauch et al. | ................ 347/134 |
| 5,889,545 A | 3/1999 | Rauch et al. | ................ 347/134 |
| 6,137,517 A | 10/2000 | Furst et al. | .................. 347/116 |
| 6,141,464 A | 10/2000 | Handley | ....................... 382/287 |
| 6,178,031 B1 | 1/2001 | Rauch et al. | ................ 359/216 |
| 6,275,244 B1 | 8/2001 | Omelchenko et al. | ....... 346/116 |
| 6,300,968 B1 | 10/2001 | Kerxhalli et al. | ............ 347/116 |
| 6,763,199 B2 * | 7/2004 | Conrow et al. | ................ 399/15 |

* cited by examiner

*Primary Examiner*—Huan Tran
(74) *Attorney, Agent, or Firm*—Joseph M. Young

(57) ABSTRACT

A method for preserving image squareness and image on image registration in a system having a plurality of imaging stations, each imaging station having an ROS. The method includes adjusting the target skew of a reference ROS within one of the plurality of imaging stations by the angular difference between the actual reference ROS position and the target position for the reference ROS and adjusting the target skew of the reference ROS by the skew of the reference ROS relative to the desired skew for image squareness.

17 Claims, 4 Drawing Sheets

METHOD FOR MAINTAINING IMAGE SQUARENESS AND IMAGE ON IMAGE REGISTRATION

This application is based on Provisional Patent Application No. 60/434,197, filed Dec. 17, 2002.

In various reproduction systems, including xerographic printing, the control and registration of the position of imageable surfaces such as photoreceptor belts, intermediate transfer belts (if used), or images thereon, is critical, and a well developed art, as shown by the exemplary patents cited below. It is well known to provide various single or dual axes control systems, for adjusting or correcting the lateral position or process position or timing of a photoreceptor belt or other image bearing member of a reproduction apparatus, such as by belt lateral steering systems or belt drive motor controls, or adjusting or correcting the lateral position or process position or timing of the placing of images on the belt with adjustable image generators such as laser beam scanners.

An important application of such accurate image position or registration systems is to accurately control the positions of different colors being printed on the same intermediate or final image substrate, to insure the positional accuracy (adjacency or overlapping) of the various colors being printed. That is not limited to xerographic printing systems. For example, precise registration control may be required over different ink jet printing heads or vacuum belt or other sheet transports in a plural color ink jet printer.

It is well known to provide image registration systems for the correct and accurate alignment, relative to one another, on both axes (the lateral axis or the process direction axis), of different plural color images on an initial imaging bearing surface member such as (but not limited to) a photoreceptor belt of a xerographic color printer. That is, to improve the registration accuracy of such plural color images relative to one another or to the image bearing member, so that the different color images may be correctly and precisely positioned relative to one another or superposed and combined for a composite or full color image, to provide for customer-acceptable color printing on a final image substrate such as a sheet of paper. The individual primary color images to be combined for a mixed or full color image are often referred to as the color separations.

Known means to adjust the registration of the images on either or both axes relative to the image bearing surface and one another include adjusting the position or timing of the images being formed on the image-bearing surface. That may be done by control of ROS (raster output scanner) laser beams or other known latent or visible image forming systems.

In particular, it is known to provide such imaging registration systems by means of marks-on-belt (MOB) systems, in which edge areas of the image bearing belt laterally outside of its normal imaging area are marked with registration positional marks, detectable by an optical sensor. For belt steering and motion registration systems (previously described) such registration marks can be permanent, such as by silk screen printing or otherwise permanent marks on the belt, such as belt apertures, which may be readily optically detectable. However, for image position control relative to other images on the belt, or the belt position, especially for color printing, typically these registration marks are not permanent marks. Typically they are distinctive marks imaged with, and adjacent to, the respective image, and developed with the same toner or other developer material as is being used to develop the associated image, in positions corresponding to, but outside of, the image position. Such as putting the marks along the side of the image position or in the inter-image zone between the images for two consecutive prints. Such MOB image position or registration indicia are thus typically repeatedly developed and erased in each rotation of the photoreceptor belt. It is normally undesirable, of course, for such registration marks to appear on the final prints (on the final image substrate).

Color registration systems for printing, as here, should not be confused with various color correction or calibration systems, involving various color space systems, conversions, or values, such as color intensity, density; hue, saturation, luminance, chrominance, or the like, as to which respective colors may be controlled or adjusted. Color registration systems, such as that disclosed herein, relate to positional information and positional correction (shifting respective color images laterally or in the process direction or providing image rotation or image magnification) so that different colors may be accurately superposed or interposed for customer-acceptable full color or intermixed color or accurately adjacent color printed images. The human eye is particularly sensitive to small printed color misregistrations of one color relative to one another in superposed or closely adjacent images, which can cause highly visible color printing defects such as color bleeds, non-trappings (white spaces between colors), halos, ghost images, etc.

Various systems and methods have been developed to control registration of image on paper after an initial registration has been made. Examples of such registration systems include those shown and described in U.S. Pat. Nos. 5,821,971; 5,889,545; 6,137,517; 6,141,464; 6,178,031; 6,275,244; and 6,300,968, the subject matter of each patent is hereby incorporated herein by reference in its entirety.

U.S. Pat. No. 5,642,202, the subject matter of which is incorporated herein by reference in its entirety, discloses a process for initial registration calibration of a printing system including a printer and a master test image document printed by the printer.

This invention is directed to systems and methods for setting up and maintaining image on paper (IOP) registration while maintaining image on image (IOI) registration in a printing device.

There are a number of sources of image on sheet or image on paper (IOP) registration errors which may be addressed, including lateral magnification, lateral margin shifts, process margin shifts, paper skew or imager skew. Lateral magnification is the magnification of the image in the lateral direction, i.e., in the direction substantially perpendicular to the process direction.

The lateral margins are the spaces between each edge of the image transferred to and developed on the substrate and each adjacent edge of the substrate that is substantially parallel to the process direction. The process margins are the spaces between each edge of the image transferred to and developed on the substrate and each adjacent edge of the substrate that is substantially perpendicular to the process direction. It should be noted that, in many xerographic image-forming devices, each image is exposed successively by one or more raster output scanner imagers. Each raster output scanner has a start of scan (SOS) sensor and an end of scan (EOS) sensor. These sensors, i.e., the SOS and EOS sensors, along with the delay before the first pixel is imaged after the start of scan occurs, and the associated timing of when the start of scan occurs, establish the lateral and process margins of a latent image which is to be developed and transferred to a substrate.

The term "reproduction apparatus" or "printer" as alternatively used herein broadly encompasses various printers, copiers or multifunction machines or systems, xerographic or otherwise, unless otherwise indicated or defined in a claim. The term "sheet" herein refers to a usually flimsy physical sheet of paper, plastic, or other suitable physical substrate for images, whether precut or web fed. A "copy sheet" may be abbreviated as a "copy" or called a "hardcopy". A "print job" is normally a set of related sheets, usually one or more collated copy sets copied from a set of original document sheets or electronic document page images, from a particular user, or otherwise related.

As to specific components of the subject apparatus or methods, or alternatives therefor, it will be appreciated that, as is normally the case, some such components are known per se in other apparatus or applications which may be additionally or alternatively used herein, including those from the art cited herein. All references cited in this specification, and their references, are incorporated by reference herein where appropriate for teachings of additional or alternative details, features, or technical background. What is well known to those skilled in the art need not be described herein.

A method for preserving image squareness and image on image registration in a system having a plurality of imaging stations, each imaging station having an ROS. The method includes adjusting the target skew of a reference ROS within one of the plurality of imaging stations by the angular difference between the actual reference ROS position and the target position for the reference ROS and adjusting the target skew of the reference ROS by the skew of the reference ROS relative to the desired skew for image squareness.

The embodiments will be described in detail herein with reference to the following figures in which like reference numerals denote like elements and wherein.

Figure 1:
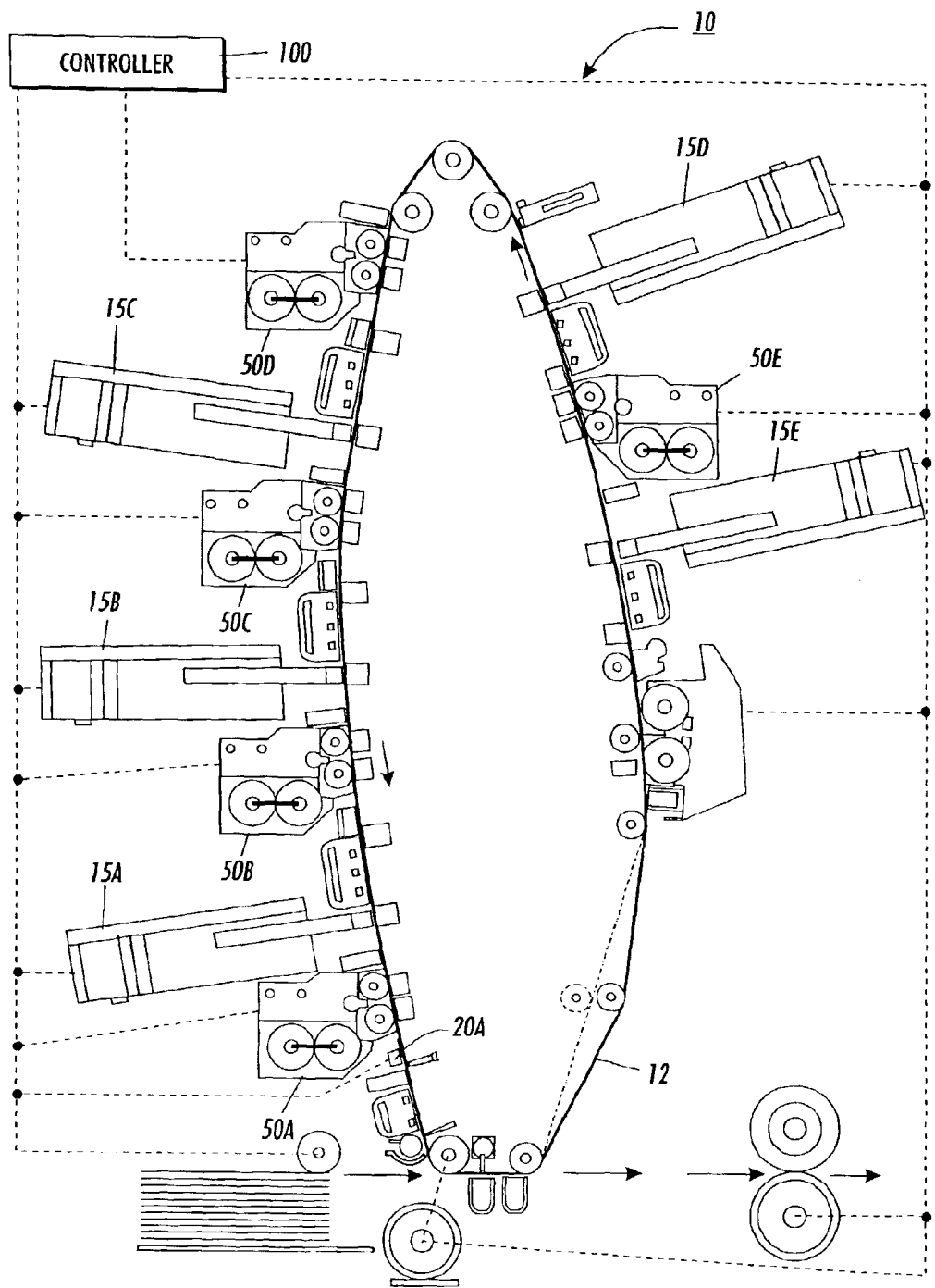
FIG. 1 is a schematic frontal view of one example of a reproduction system for incorporating one example of the subject registration system, in this case, a color-on-color xerographic printer.

FIG. 1 schematically illustrates a printer 10 as one example of an otherwise known type of xerographic, plural color "image-on-image" (IOI) type full color (cyan, magenta, yellow and black imagers) reproduction machine, merely by way of one example of the applicability of the current cursor correction system. A partial, very simplified, schematic perspective overhead view of an ROS thereof is provided in FIG. 2. This particular type of printing is also referred as "single pass" multiple exposure color printing. It has plural sequential ROS beam sweep PR image formations and sequential superposed developments of those latent images with primary color toners, interspersed with PR belt re-charging. Further examples and details of such IOI systems are described in U.S. Pat. Nos. 4,660,059; 4,833,503; 4,611,901; etc.

However, it will be appreciated that the disclosed improved registration system could also be employed in non-xerographic color printers, such as ink jet printers, or in "tandem" xerographic or other color printing systems, typically having plural print engines transferring respective colors sequentially to an intermediate image transfer belt and then to the final substrate. Thus, for a tandem color printer it will be appreciated the image bearing member on which the subject registration marks are formed may be either or both on the photoreceptors and the intermediate transfer belt, and have MOB sensors and image position correction systems appropriately associated therewith. Various such known types of color printers are further described in the above-cited patents and need not be further discussed herein.

Figure 2:
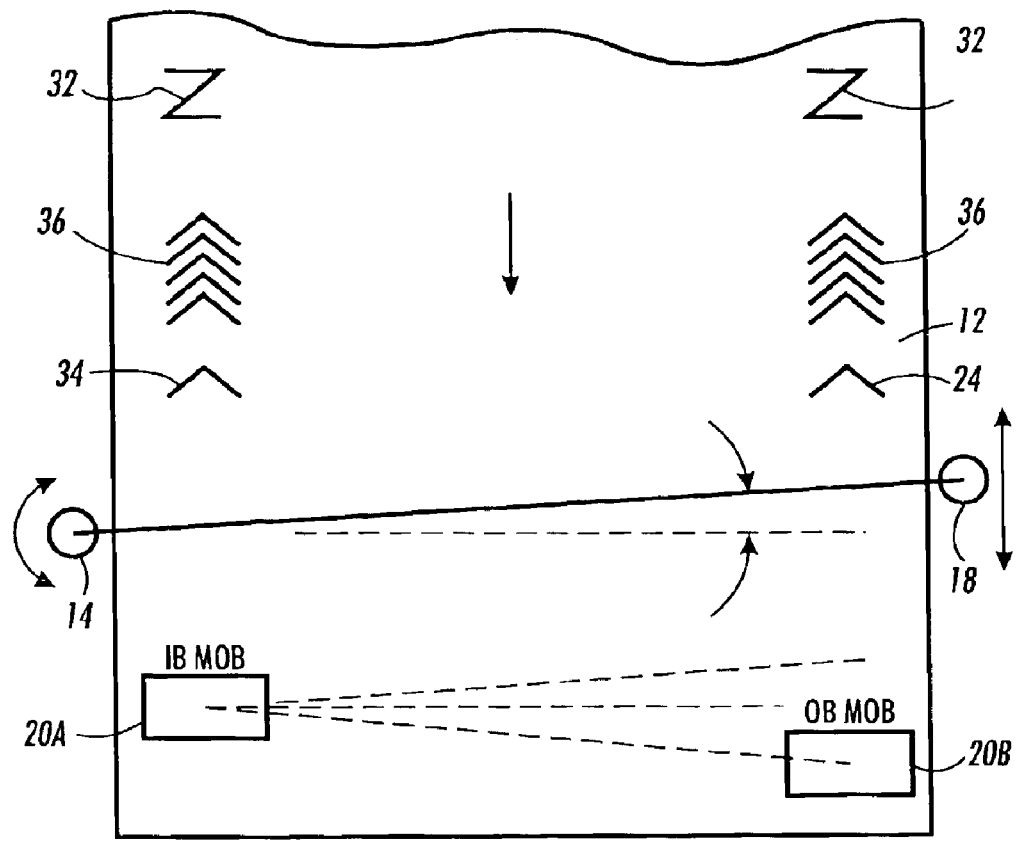
FIG. 2 is a schematic general representation of an overhead view of an ROS over a belt.

Referring to the exemplary printer 10 of FIG. 1, all of its operations and functions may be controlled by programmed microprocessors, as described above, at centralized, distributed, or remote system-server locations, any of which are schematically illustrated here by the controller 50. A single photoreceptor belt 12 may be successively charged, ROS (raster output scanner) imaged, and developed with black or any or all primary colors toners by a plurality of imaging stations. In this example, these plural imaging stations include respective ROS's 15A, 15B, 15C, 15D, and 15E; and associated developer units 50A, 50B, 50C, 50D, and 50E. A composite plural color imaged area 30, as shown in FIG. 2, may thus be formed in each desired image area in a single revolution of the belt 12 with this exemplary printer 10, providing accurate registration can be obtained. Two MOB sensors (20A in FIGS. 1, 20A and 20B in FIG. 2) are schematically illustrated, and will be further described herein in connection with such registration.

In embodiments 50A–D are used to develop black, cyan, yellow, and magenta, respectively. These images are developed successively on the photoreceptor belt before being transferred to a sheet of paper.

In FIG. 2 it may be seen that toner registration mark images 32 have been formed along both sides of the photoreceptor belt 12, adjacent but outside of its imaged area 30, as will be further described. These marks 32 can have any of a variety of shapes and the illustrated shapes are meant to be exemplary only. Examples of other types of MOB are, for example, given in the U.S. Pat. No. 6,300,968, issued Oct. 9, 2001. The particular shape of the marks is not important to the present invention. These marks are used to ensure that images drawn on the belt at different stations are aligned with each other, and particularly to ensure that each color is drawn in the appropriate place. When printing multi-color documents it is important to keep the colors aligned.

MOB registration marks corresponding to different toner colors are imaged and developed in close alignment both with respect to each other and with respect to the MOB sensors 20A, 20B. U.S. Pat. No. 6,275,244 discloses an exemplary image-on-image (IOI), or color on color, registration setup system, the subject matter of which has already been incorporated in its entirety. The IOI registration setup aligns the MOB registration marks 32 along the sides of the belt with the MOB sensors 20A, 20B. After IOI registration setup has been performed, all the colors—magenta, yellow, cyan, and black—are aligned to each other, and the MOB registration marks are centered under the MOB sensors 20A, 20B. By way of background, an exemplary registration system includes the following elements: an initial image registration or setup mode, an expanded chevron registration mode, and a standard regular or fine registration mode.

An initial image registration or setup mode can provide initial registration even from a gross initial misregistration. Initial gross color images misregistration can exist, for example, when the machine is first run after manufacturing, or after a service call, after a ROS repair, after a PR belt change, etc. In such cases the initial lateral position of each color image area, and thus its directly associated MOB position on the PR belt 12, could be out of registration by +/−3 mm, for example. If either of the MOB sensors 20A, 20B has a lateral sensing range for a standard chevron belt mark target 34 of less than 1 mm, it will not provide registration of such an out-of-registration target. In order to insure that the MOB sensors "see" each color registration mark in this initial state (the image registration setup mode), there is provided an initial generation, during this initial state only, of "Z" shaped color registration marks (for example, registration marks 32 in FIG. 2), providing the MOB sensors with a greater lateral sensing range, instead of chevron shaped marks such as 34A–F. Appropriate initial use of such "Z" marks instead of chevron marks on the belt for initial registration can increase the lateral sensing range of the MOB sensors in that mode of operation by an order of magnitude, e.g., from approximately +/−1 mm for chevron marks to approximately +/−10 mm for "Z" marks. This can avoid manual initial adjustments to get the registration within the sensing and control range of the MOB sensors. To express that another way, avoiding "open loop" adjustment situations where the otherwise desired chevron registration marks are out of range and not detectable.

By using "Z" targets imaged along the length of the belt for each color being imaged, the lateral position, lateral magnification, and skew of each color can be measured relative to the fixed position of the MOB sensors. These new values may then be updated within the controller 100, such as in a ROS interface module.

This initial calibration procedure of writing, developing, and measuring respective "Z" targets around the belt length (the belt circumference, the process direction) is repeated for each color. The MOB sensor error signals are converted to lateral position and lateral magnification correction signal for the respective ROS in a known manner. It may be in terms of first pixel delay times and pixel clock frequencies for the ROS systems. One color, such as cyan, may be used as a calibration or base position. The PR belt rotation, and this iterative routine calibration process, may be repeated until convergence within acceptable thresholds is achieved to a preset threshold.

Also, an "expanded chevrons" registration mode may be additionally provided if desired between the gross registration phase and the standard chevron phase. In this mode, the chevron marks may comprise wider than normal chevrons 36 of different colors for improved initial registration in the process direction. Due to initial misregistration tolerances, lead edge (process direction) misregistration may initially be too large for the standard size chevrons ensemble or set, so that such an expanded chevron mode of operation may be initially desirable. The expanded chevron mode can be used to refine and adjust the position of the cyan or other registration baseline image offsets.

This optional "expanded chevron" step or mode provides a target pattern that will allow a coarse color registration adjustment. That is, a different target which will allow the marks-on-belt sensor to detect the position of each color even if there is a large amount of process direction error between the colors. The MOB sensors may not readily detect color positions with the standard size chevrons ensemble if there is a large amount of process registration error between the colors, because the marks may be nominally too close together. In the expanded chevron ensemble, however, the marks are spaced out sufficiently in the process direction so that there is no overlap of colors in the presence of large process direction errors. For example, by providing an expanded chevron dimension in the process direction of about 7.4 mm as opposed to a normal chevron dimension in the process direction of about 0.72 mm. However, the angles of the legs of these expanded chevrons may remain the same. The transverse dimension (widths) of these chevrons may also be the same, e.g., about 10.4 mm.

Following either the initial or gross registration mode or the expanded chevron mode is a standard regular or fine registration mode or step of developing standard chevron shaped registration marks 34 on the photoreceptor belt. Both of these different sets of different marks may provide the MOB registration marks for the registrations of the different colors of a plural color printer.

These steps are repeated until the positions of the different color registration marks are substantially aligned with each other and with the MOB sensors.

After IOI registration has been setup, image to paper. (IOP) registration must be setup. Paper here refers to a variety of substrates on which images and text may be printed. In order to adjust Image to Paper registration (IOP registration setup), the operator makes measurements of an image on a sheet of paper. The system adjusts the position of the image and the paper during an IOP Registration Setup. An exemplary IOP registration setup process is described in U.S. patent application Ser. No. 10/046,166, filed Jan. 16, 2002, entitled "SYSTEMS AND METHODS FOR. ONE-STEP SETUP FOR IMAGE ON PAPER REGISTRATION," hereby incorporated in its entirety. When the IOP Registration setup has been completed, the image is aligned with the paper, but the image has moved away from the center of the MOB sensors. As part of the IOP registration setup, the image squareness is checked and corrected. The image squareness is corrected by adjusting the position of the ROS.

IOI Registration is constantly being monitored and adjusted in order to stay within tight specifications. If the MOB registration mark cursors are not re-aligned to the center of the MOB sensors, then the IOI Registration system will move the image right back to where it started from before IOP Registration Setup and the image will no longer be registered to the paper.

Further, because of drift in the system, repeated 101 registration setups are performed. Drift is caused by factors such as, for example, various noises in the system that cause the positions of the images shift over time. Temperature is the most significant noise, as the system heats up and cools down over time. MOB sensors are used for both monitoring and controlling the color to color or IOI registration and the MOB sensors also control the absolute lateral position of the image as well, which helps to maintain image to paper registration.

In embodiments, the position of the MOB registration mark cursors are adjusted to be under the MOB sensors again (to within cursor resolution limits) without altering the desired image position for IOP registration. This allows for a user to repeat an IOI or an IOP registration setup without repeating the other. The following equations are used by the controller to position the MOB registration marks 32 so that they end up aligned under the MOB sensors Referring to FIG. 2, there is shown a schematic representation of an overhead view of an ROS scanner 13 over a photoreceptor belt 12. The adjustable ROS scanner 13 contains IB and OB ROS balls 14, 18 at either end of an arm 16. These balls dock with the photoreceptor module. The IB ROS ball 14 is placed such that it may rotate, but not move translationally. The ROS scanner is able to pivot about the ROS ball 14. OB ROS ball 18 and arm 16 are free to swing about the IB ROS ball 14. The choice of which ball 14, 18 to pivot about is arbitrary and OB ROS ball 18, could very well be the ball about which the ROS scanner 13 pivots.

For example, in embodiments, the OB-ROS ball 18 docks in a notch 21 in a docking portion 22 of the printer. See FIG. 3. A pair of flexible springs 24, 26 is fixedly mounted to the docking portion 22 and to a frame surface 28. In embodiments, the springs 24, 26 are formed in the shape of a flat ribbon. As viewed in FIG. 1, only the edges of the springs 24 and 26 are visible. The springs 24 and 26 hold the docking portion 22 against a cam 30 so that the cam 30 can rotate the ROS 13 about the ROS ball 14. The docking portion 22, flexible springs 24 and 26, cam 30 and a stepper motor 31 form an adjustment system wherein the cam 30 is driven by the stepper motor 31 so that the process of rotating the ROS 13 can be automated electronically. Any of a number of known methods may be used to move the ROS ball 18 as necessary. For example, a cam 30 and a stepper motor 31 can form an adjustment system wherein the stepper motor 31 drives the cam 30 so that the process of rotating the ROS 13 can be automated electronically.

It is to be appreciated that other arrangements and devices can be used for automating adjustment of the ROS 13 electronically, and that these other devices and arrangements fall within the scope of the present invention.

Figure 3:
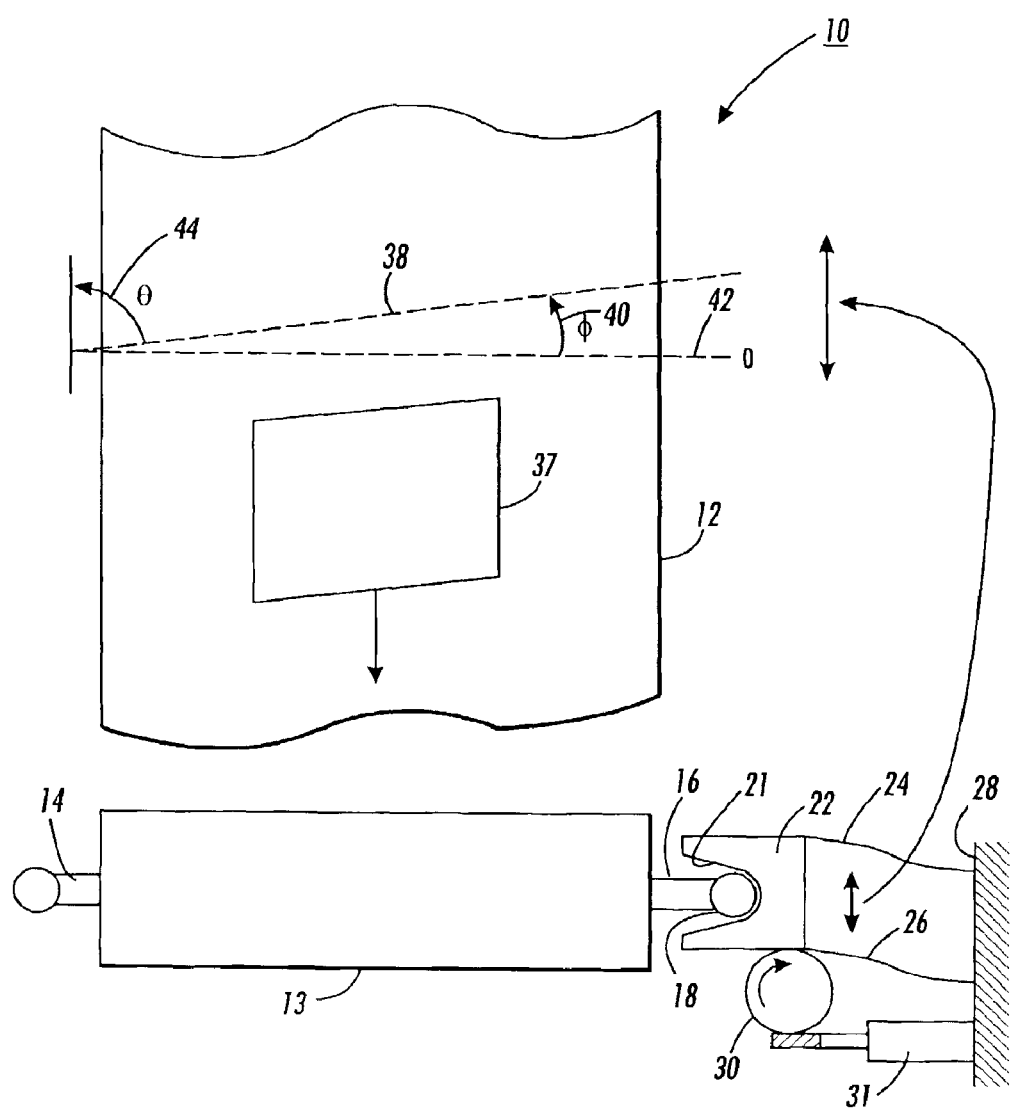
FIG. 3 is a schematic representation of a more detailed embodiment of an ROS over a belt as shown in FIG. 2.

As viewed from the perspective of FIGS. 2 and 3, ROS 13 is positioned above a photoreceptor belt 12, and the ROS housing may include a laser, modulator, polygon scanner, and other optical elements required to focus and direct output beams which are in turn scanned across the moving photoreceptor belt 12. Image lines are exposed at the photoreceptor belt 12 with each scan to create a latent electrostatographic image 37 of the document being imaged. The latent image 37 can then be developed and transferred to a copy-sheet with the transferred image being fused. This process is well known to persons of average skill in the art. Scan line 42 represents the desired skew for perfect image squareness. Multiple factors can contribute to the skew of the ROS not matching the skew for perfect image squareness. If, for example, the photoreceptor belt 12 is skewed in the process direction, the scan line 38 will not be perpendicular to the belt edges or parallel to the lead edge of the images in the process direction. The scan line 38 will vary from the desired direction 42 by a skew angle 40, referred to hereinafter as $\Delta Skew_{ROS}$. The resulting output prints will exhibit copy quality defects resulting from the scan line skew.

According to the present invention, the ROS 13 is mounted within printer section 10 in such a way as to enable adjustment of the housing components to compensate for the housing-to-belt skew angle $\Delta Skew_{ROS}$.

As previously described, ROS 13 is pivotally mounted. The docking portion 22 is, therefore, held in contact with the cam 30 which can rotate the ROS scanner 13 about the pivot point 14 by moving the docking portion 22 in the desired direction to reduce skew angle $\Delta Skew_{ROS}$. For example, in embodiments, the cam 30 can be configured so that rotating the cam in a clockwise direction from an initial position will cause ROS housing 13 to rotate in a counterclockwise direction, thereby numerically increasing skew angle $\Delta Skew_{ROS}$, wherein a preferred value of zero is represented by the dashed line 42. Similarly, rotating the cam in a counterclockwise direction from an initial position will cause ROS 13 to rotate in a clockwise direction, thereby numerically reducing skew angle $\Delta Skew_{ROS}$.

A first step in measuring skew angle $\Delta Skew_{ROS}$ is to print a test pattern of markers, such as cross hatches for example.

Figure 4:
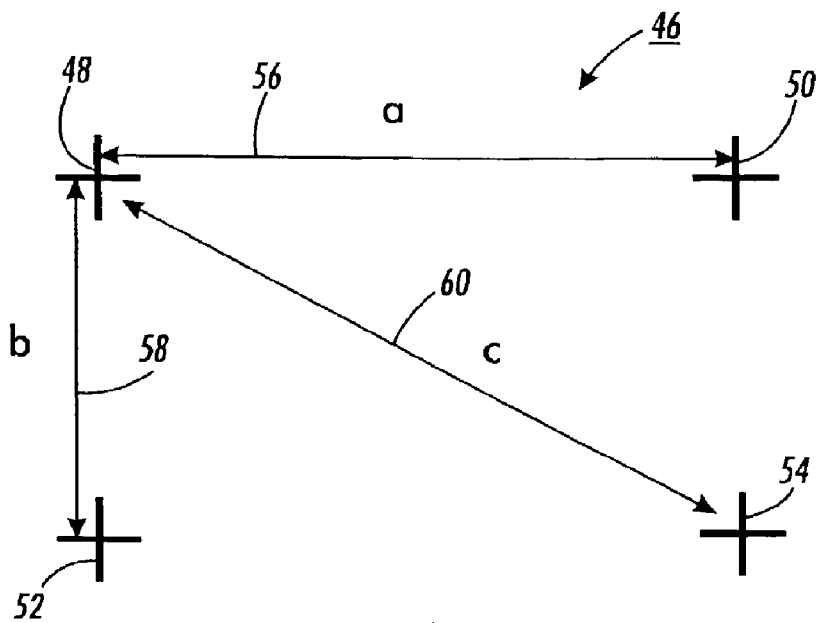
FIG. 4 shows a test pattern print output used to determine scan line skew.

FIG. 4 shows a test pattern 46 suitable for use in the present embodiment. Cross hatches 48, 50, 52 and 54 are printed such that they form the four corners of a rectangle. Rather than measuring the skew angle $\Delta Skew_{ROS}$, or the complementary ROS angle θ, directly, it is more convenient and accurate to measure the distances between three pairs of the cross hatches as illustrated. The measured distances are labeled a (56), b (58) and c (60) in FIG. 4. Distance 56 represents a horizontal distance, distance 58 represents a vertical distance, and distance 60 represents a diagonal distance.

Figure 5:
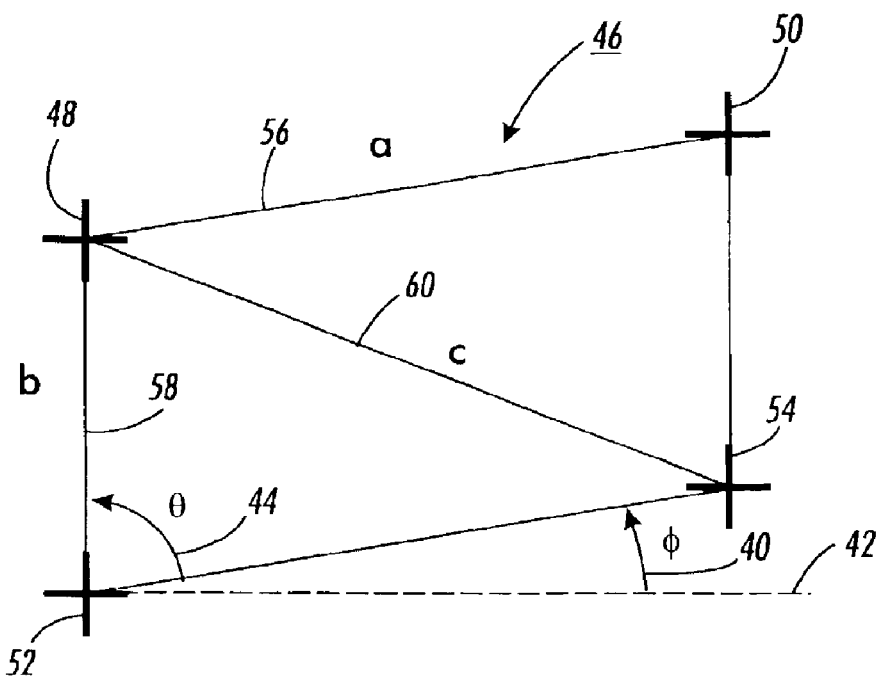
FIG. 5 shows a skewed test print output and measurements.

Referring now to FIG. 5, which shows an exemplary printed test pattern having a nonzero skew angle $\Delta Skew_{ROS}$, and with continuing reference to FIGS. 1 and 2, a procedure of determining ROS angle θ 44 and skew angle $\Delta Skew_{ROS}$ 40 is now described. Since ROS skew does not affect the angle of the line connecting the leftmost two crosshairs 48, 52 (distance b), it follows that $\Delta Skew_{ROS} = \pi/2 - \theta$. Using the Law of Cosines, θ can be solved for with $$\theta = \cos^{-1}\left(\frac{a^2 + b^2 - c^2}{2ab}\right) \tag{1}$$

and hence $$\Delta Skew_{ROS} = \frac{\pi}{2} - \cos^{-1}\left(\frac{a^2 + b^2 - c^2}{2ab}\right) \tag{2}$$

or $$\Delta Skew_{ROS} = \sin^{-1}\left(\frac{a^2 + b^2 - c^2}{2ab}\right) \tag{3}$$

thus providing the desired measurement of skew angle $\Delta Skew_{ROS}$ 40. Any difference from nominal between the current skew position of the reference color ROS and the desired position of the reference color ROS for image squareness is "removed" during the Image to Paper setup procedure. The image to paper setup routine computes the number of steps to move the ROS De-skew motor in order to align image squareness. The angle of the MOB sensors relative to the PR belt process motion may be different from the desired angle of the ROS for image squareness on the paper. The MOB sensors can measure the skew offset between the ROS skew position and the IB to OB MOB sensor positions.

The desired skew offset of the reference color ROS to the MOB sensors. (SOS3) can be determined by reading the MOB sensors. This offset value is used in order to maintain the image squareness.

The registration controller will then need to convert the error from an angular measurement (radians) to an appropriate number of ROS de-skew motor microsteps. The setpoint position of each ROS (M, Y, C, K) is adjusted according to the number of microsteps calculated (Eq. 8).

Obviously, the number of microsteps required to pivot the ROS about a particular angle depends upon the distance between the center of inboard and outboard ROS balls 14, 18. The longer the arm 16, the greater the number of steps that need to be taken. Assuming the cam 30 and stepper motor 31 described above are used, $\Delta Skew_{ROS}$ 40 needs to be translated into the number of steps the motor 31 must take.

$$LTPFS = CG*DPS \tag{4}$$

where LTPFS is the arclength per step of the motor, CG is the arclength per degree of de-skew motor rotation, and DPS is the degree of de-skew motor rotation per step of the motor.

In embodiments, CG is approximately 29 microns/deg and DPS is approximately 1.8 deg/step, which results in LTPFS equaling 52.2 microns/step. Obviously, these values will vary depending on the machine and its components.

Next, one can calculate the linear travel per microstep (LTP$\mu$S).

$$LTP\mu S=LTPFS/256\mu steps/step \qquad (5)$$

If LTPFS equals 52.2 microns/step, then LTP$\mu$S equals 0.2039 microns/$\mu$step. Finally, one can calculate the angular movement per $\mu$step of the motor.

$$RAMPM=LTP\mu S/ROSB2B \qquad (6)$$

Where RAMPM is the angular movement of the ROS scanner 13 per $\mu$step of the motor 31, and ROSB2B is the length from the center of the IB ROS ball 14 to the OB ROS ball 18.

In embodiments, the length ROSB2B equals 503238 microns, which if plugged into Eq. 6 yields approximately 4.052e-7 rad/$\mu$step The equations below assume that an IOI registration setup has already been performed, so the location of the reference color ROS to the MOB sensors is already known. That is, there is already a known target value for the skew of the reference color ROS to the MOB sensors. This is called the "skew offset" value. Also, the error between the skew offset value and the actual skew of the reference color ROS is detectable by the MOB sensors. This is called the "skew residual" value. The residual exists because the IOI registration convergence is not perfect, so there will always be a small amount of error between where the ROS ended up relative to where the convergence attempted to position it.

One can now determine the number of microsteps desired to move the de-skew motors in order to achieve image squareness.

$$\Delta\mu steps=-1*\Delta Skew_{ROS}/RAMPM \qquad (7)$$

where $\Delta\mu$steps is the number of microsteps desired to move the de-skew motors in order to achieve image squareness and $\Delta Skew_{ROS}$ is the skew of the reference color ROS (for example, cyan) relative to the desired skew for image squareness. The operator derives $\Delta Skew_{ROS}$ during an IOP registration setup. This is known and has been derived previously, for example, in U.S. patent application Ser. No. 10/046,166, which is hereby incorporated by reference. By convention, $\Delta Skew_{ROS}$ is positive if the OB corner of a square image will be closer to the leading edge of the paper than the IB corner (assuming no paper skew).

Once $\Delta\mu$steps is found, then it is used to alter the position the ROS at each of the imaging stations:

$$ROSOPS_i=ROSOPS_i-\Delta steps \qquad (8)$$

where $ROSOPS_i$ is the position of the ROS of the ith imaging station. Each ROS is rotated about its IB ball 14 by the stepper motor 31 by $\Delta\mu$steps. In order to maintain color to color registration while making the reference color skew adjustment, all imaging stations should be updated per Eq. 8. This is done to preserve the color-to-color registration from a previous 101 setup.

Next, one can calculate the correction to the target position of a reference color such as, for example, cyan.

$$SOS3=SOS3+CSR+\Delta Skew_{ROS} \qquad (9)$$

where SOS3 is the target skew position of the cyan ROS relative to the MOB sensors (In embodiments, the cyan ROS is located at the third imaging station, hence the 3) and CSR is the residual skew error between the target cyan ROS position (SOS3) and the actual cyan ROS position. CSR is measured with the MOB sensors during image registration maintenance and during IOI registration setup (during the Standard Chevron Reference Image Adjust Phase).

SOS3 should now be in the skew position desired to maintain image squareness. SOS3 is initially zero after an IOI setup (i.e., there is no skew between the target value of the ROS and the MOB sensors). As a line drawn between the IB and OB MOB sensors may not be perfectly perpendicular to the direction of belt travel, the above correction is required to adjust the ROS to maintain image squareness.

After the SOS3 calculation (Equation 9) has been completed during IOP registration setup, the residual skew error should be set to zero. This ensures that the residual is accounted for only once in the IOP registration setup, regardless of the number of iterations required to achieve acceptable IOP registration. In subsequent IOI registrations and partial IOI registrations, CSR evolves iteratively through the IOI process.

$$CSR=0 \qquad (10)$$

The new cyan skew offset is now used as the new desired skew position during image registration monitoring.

In order to enable seamless transitions between IOP registration setup, IOI registration setup, and image registration maintenance, additional modifications to the IOI registration system are done.

During the Z Target Adjust Phase of the IOI registration setup, no skew adjustments are made (i.e. image squareness does not change during this phase).

During each iteration of an Expanded Chevron Reference Image Adjust Phase, the target skew position of the reference ROS (e.g., cyan) relative to the MOB sensors is determined. The actual skew position of the reference (cyan) ROS relative to the MOB sensors is measured by the MOB sensors and any cyan skew residual is subtracted out according to Eq. 11. The resulting value is stored as the target skew position, SOS3. If a full IOI registration setup is requested, but an IOP registration setup is not desired, this calculation allows the user to maintain IOP registration while performing the IOI registration setup. Eq. 11 will calculate a cyan skew offset that is extremely close to any offsets previously calculated during an IOP registration setup.

$$SOS3=CS2MOBs-CSR \qquad (11)$$

where CS2MOBs is the actual skew position of the cyan ROS relative to the MOB sensors (radians), measured by the MOB sensors during the Expanded Chevron Reference Image Adjust Phase of the IOI registration setup.

During the Standard Chevron Reference Image Adjust Phase, the reference color skew is measured and adjusted relative to the target skew position (SOS3) value. In other words, Equations 7–9 are performed again. After each iteration of this setup phase, the average measurement of cyan skew relative to the cyan skew offset value is stored in the NVM location for the cyan skew residual (CSR).

During an Image Registration Maintenance Mode, i.e., during an actual print job, the running average of the cyan skew measurement relative to the cyan skew offset is stored in the NVM location for the cyan skew residual value (CSR). This value is updated whenever the running averages are updated. These adjustments to the CSR are done because of the potential for drift in large print runs. The cyan skew residual value will likely change over the course of a print job due to various factors. To keep the target skew position (SOS3) of the reference color under the MOB sensors, the CSR is adjusted to account for these changes.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention.

What is claimed:

1. A method for preserving image squareness and image on image registration in a system having a plurality of imaging stations, each imaging station having an ROS, the method comprising:

adjusting a target skew of a reference ROS within one of the plurality of imaging stations by the angular difference between an actual reference ROS position and a target reference ROS position; and adjusting the target skew of the reference ROS by a skew of the reference ROS relative to a desired skew for image squareness.

2. The method of claim 1, wherein the adjustments made to the reference ROS are made to the ROS of each imaging station.

3. The method of claim 1, further comprising setting the angular difference between the target ROS position and the actual ROS position to zero after an image on paper registration.

4. The method of claim 3, further comprising determining the target skew position by measuring the skew of the reference ROS relative to the MOB sensors during each iteration of an Expanded Chevron Reference Image Adjust Phase, and subtracting the angular difference between the target ROS position and the actual ROS position.

5. The method of claim 1, wherein the method is performed during the Standard Chevron Reference Image Adjust Phase.

6. The method of claim 1, further comprising storing the average measurement of reference skew relative to the reference skew offset value in a NVM location for the residual skew in the position of the reference ROS after each iteration of this setup phase.

7. The method of claim 1, further comprising:

determining the number of microsteps a stepper motor must take to de-skew the reference ROS after an image on paper registration is performed;

adjusting the skew of the reference ROS within each imaging station by the number of microsteps determined.

8. The method of claim 1, wherein a measurement of the skew of the actual reference ROS position relative to the target ROS position is made by the MOB sensor.

9. The method of claim 1, wherein a measurement of the skew of the reference ROS relative to the desired skew for image squareness is determined from a generated test pattern.

10. The method of claim 1, where the method is performed after both an image on image registration setup and an image on paper registration setup has been performed.

11. A method for preserving image squareness and image on image registration in a system having a plurality of imaging stations, each imaging station having an ROS, the method comprising:

generating a test pattern;

printing a test pattern;

determining the angular difference between a target skew and a desired skew for image squareness of a reference ROS of an imaging station based upon measurements made of the test pattern;

detecting the angular difference between the target skew and an actual skew of the reference ROS;

adding both the angular difference between the actual and target positions of the reference ROS and the angular difference between the target skew and the desired skew for image squareness of the reference ROS to the target skew of the reference ROS.

12. The method of claim 11, further comprising setting the angular difference between the target skew and an actual skew of the reference ROS to zero.

13. The method of claim 11, further comprising adding both the angular difference between the actual and target positions of the reference ROS and the angular difference between the target skew and the desired skew for image squareness of the reference ROS to an ROS of every other imaging station.

14. The method of claim 11, where the method is performed after an image on image registration setup has been performed.

15. An IOI registration system, comprising an initial gross registration mode including a plurality of first registration marks imaged on an image bearing surface, said registration marks being formed to provide a wider misregistration latitude for said-registration marks sensor in said process direction, imaging said first registration marks on said image bearing surface until an initial gross registration is achieved, automatically switching said color registration system to a second registration mode in which said color registration system automatically images a plurality of second registration marks on said image bearing surface, wherein the position of a reference ROS is adjusted by the actual skew position of the reference ROS relative to the MOB sensors minus the error between the actual skew position and the target skew position.

16. The method of claim 15, wherein the adjustments made to the reference ROS are made to the ROS of each imaging station.

17. The method of claim 15, where the method is performed after an image on paper registration.

* * * * *